(12) United States Patent
Chen et al.

(10) Patent No.: US 12,164,150 B2
(45) Date of Patent: Dec. 10, 2024

(54) OPTICAL WAVEGUIDE PASSIVATION FOR MOISTURE PROTECTION

(71) Applicant: Acacia Communications, Inc., Maynard, MA (US)

(72) Inventors: Li Chen, Maynard, MA (US); Long Chen, Maynard, MA (US); Christopher Doerr, Maynard, MA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/373,576

(22) Filed: Jul. 12, 2021

(65) Prior Publication Data

US 2022/0011507 A1 Jan. 13, 2022

Related U.S. Application Data

(60) Provisional application No. 63/050,440, filed on Jul. 10, 2020.

(51) Int. Cl.
*G02B 6/132* (2006.01)
*G02B 6/122* (2006.01)
*G02B 6/136* (2006.01)

(52) U.S. Cl.
CPC ............. *G02B 6/132* (2013.01); *G02B 6/122* (2013.01); *G02B 6/136* (2013.01)

(58) Field of Classification Search
CPC ........... G02B 6/122; G02B 6/13; G02B 6/132
See application file for complete search history.

(56) References Cited

U.S. PATENT DOCUMENTS 6,415,066 B1 * 7/2002 Harpin .................. G02B 6/122
385/14
7,477,812 B2 * 1/2009 Nielson ................ G02B 6/3584
385/16

(Continued)

FOREIGN PATENT DOCUMENTS

EP        0837352 A2 *  4/1998
JP        5-188227 A  *  7/1993

(Continued)

OTHER PUBLICATIONS

Y. Wang et al. Effects of thin coating on guided mode and sidewall-roughness scattering loss in slot waveguides. Physica Scripta, 95, 045502, Feb. 2020. (Year: 2020).*

(Continued)

*Primary Examiner* — Michael Stahl
(74) *Attorney, Agent, or Firm* — K&L GATES LLP (57) ABSTRACT

In part, in one aspect, the disclosure relates to a method for passivating a waveguide of an optical circuit. The method includes etching a suspended waveguide in the optical circuit; the suspended waveguide having a top surface, a bottom surface, and side surfaces; and covering the top surface and side surfaces of the suspended waveguide with a passivation coating having a thickness that ranges from between about 10 nm to about 20 nm. In one embodiment, the method further includes removing one or more coatings from a portion of the optical circuit. The disclosure also relates to various passivated optical silicon circuit embodiments.

19 Claims, 5 Drawing Sheets

(56) References Cited

U.S. PATENT DOCUMENTS

| | | | |
|---|---|---|---|
| 10,416,380 B1 | 9/2019 | Chen et al. | |
| 2004/0062484 A1* | 4/2004 | Germann | G02B 6/30 385/49 |
| 2005/0169566 A1* | 8/2005 | Takahashi | G02F 1/011 385/1 |
| 2009/0274418 A1* | 11/2009 | Holzwarth | B82Y 20/00 385/30 |
| 2012/0076465 A1* | 3/2012 | Chen | G02B 6/1228 385/124 |
| 2013/0056623 A1* | 3/2013 | Lipson | G02F 1/025 257/458 |
| 2013/0279845 A1* | 10/2013 | Kobrinsky | G02B 6/136 438/31 |
| 2013/0307109 A1 | 11/2013 | Sawayama | |
| 2015/0107357 A1* | 4/2015 | Hentz | G01D 5/268 73/382 G |
| 2016/0147020 A1* | 5/2016 | Musk | G02B 6/305 427/163.1 |
| 2020/0158635 A1* | 5/2020 | Sakamoto | G01N 21/3504 |
| 2020/0278485 A1* | 9/2020 | Iwata | C23C 4/134 |

FOREIGN PATENT DOCUMENTS

| | | |
|---|---|---|
| JP | 2018-146669 A * | 9/2018 |
| WO | 2010098295 A1 | 9/2010 |
| WO | 2013095426 A1 | 6/2013 |
| WO | WO 2018/090593 A1 * | 5/2018 |
| WO | WO 2022/066096 A1 * | 3/2022 |

OTHER PUBLICATIONS

PCT International Search Report and PCT Written Opinion for PCT International Application No. PCT/US2021/041322; mailing date Oct. 13, 2021; (34 pages).

* cited by examiner

OPTICAL WAVEGUIDE PASSIVATION FOR MOISTURE PROTECTION

CROSS REFERENCE TO RELATED APPLICATIONS

This application claims priority to and the benefit of U.S. Provisional Patent Application No. 63/050,440 filed on Jul. 10, 2020, the disclosure of which is herein incorporated by reference in its entirety.

FIELD

This disclosure relates generally to the field of passivation and moisture protection in optical communication systems.

BACKGROUND

Contemporary optical communications and other photonic systems make extensive use of photonic integrated circuits that are advantageously mass-produced in various configurations for various purposes.

SUMMARY

In part, in one aspect, the disclosure relates to a method for passivating a waveguide of an optical circuit. The method includes etching a suspended waveguide in the optical circuit; the suspended waveguide having a top surface, a bottom surface, and side surfaces; and covering the top surface and side surfaces of the suspended waveguide with a passivation coating having a thickness that ranges from between about 10 nm to about 20 nm. In one embodiment, the method further includes removing one or more coatings from a portion of the optical circuit. The disclosure also relates to various passivated optical silicon circuit embodiments.

In one embodiment, the passivation coating is $Si_3N_4$. In one embodiment, covering the top surface and side surfaces of the suspended waveguide with a passivation coating includes applying a $Si_3N_4$ coating having a thickness greater than 100 nm and removing a portion of the $Si_3N_4$ coating until the $Si_3N_4$ coating has a thickness that ranges from between about 10 nm to about 20 nm. In one embodiment, the optical circuit includes a stack of a plurality of layers, wherein one of the layers is silicon substrate having a top surface and a bottom surface.

In one embodiment, the method further includes removing a portion of the top surface of the silicon substrate to define a cavity below the suspended waveguide, wherein the suspended waveguide includes $SiO_2$. In one embodiment, the method further includes removing a portion of the bottom surface of the silicon substrate to define a cavity. In one embodiment, the method further includes forming a metal heater relative to one or more layers of the suspended waveguide. In one embodiment, the passivation coating is a metal oxide, a metal nitride, or a silicon oxynitride.

In part, in another aspect, the disclosure relates to an optical silicon circuit. The optical silicon circuit may include a substrate comprising silicon; one or more regions of optical waveguide material disposed on the substrate; and one or more regions of a passivation coating disposed on a top surface and a side surface of the one or more regions of optical waveguide material, wherein thickness of passivation coating ranges from about 10 nm to about 20 nm, wherein optical waveguide material.

In one embodiment, the passivation coating includes $Si_3N_4$. In one embodiment, the passivation coating includes a silicon nitride, a metal oxide, a metal nitride, or a silicon oxynitride. In one embodiment, the optical waveguide material is etched to define one or more cavities. In one embodiment, the optical waveguide material is etched to define a suspended waveguide. In one embodiment, the optical silicon circuit further includes one or more silicon nitride waveguides disposed in the optical waveguide material. In one embodiment, the substrate is silicon-on-insulator wafer having a top surface and a bottom surface. In one embodiment, a portion of either the top surface or the bottom surface of the silicon-on-insulator wafer has been removed to define one or more cavities.

In part, in yet another aspect, the disclosure relates to product made by a process. The process may include etching a suspended waveguide in the optical circuit; the suspended waveguide having a top, bottom and sides; and covering the top and sides of the suspended waveguide with a passivation coating of a thickness between about 10 nm to about 20 nm. In one embodiment, the product made by the process further includes removing a coating from a portion of the optical circuit. In one embodiment, for product made by the process, the passivation coating includes $Si_3N_4$. In one embodiment, for product made by the process, the passivation coating includes a silicon nitride, a metal oxide, a metal nitride, or a silicon oxynitride. Although, the disclosure relates to different aspects and embodiments, it is understood that the different aspects and embodiments disclosed herein can be integrated, combined, or used together as a combination system, or in part, as separate components, devices, and systems, as appropriate. Thus, each embodiment disclosed herein can be incorporated in each of the aspects to varying degrees as appropriate for a given implementation. Further, the various apparatus, optical elements, passivation coatings/layers, optical paths, waveguides, splitters, couplers, combiners, electro-optical devices, inputs, outputs, ports, channels, components and parts of the foregoing disclosed herein can be used with any laser, laser-based communication system, waveguide, fiber, transmitter, transceiver, receiver, and other devices and systems without limitation.

These and other features of the applicant's teachings are set forth herein.

BRIEF DESCRIPTION OF THE FIGURES

Unless specified otherwise, the accompanying drawings illustrate aspects of the innovations described herein. Referring to the drawings, wherein like numerals refer to like parts throughout the several views and this specification, several embodiments of presently disclosed principles are illustrated by way of example, and not by way of limitation. The drawings are not intended to be to scale. A more complete understanding of the disclosure may be realized by reference to the accompanying drawings in which.

DETAILED DESCRIPTION

Generally, exposure to moisture can have negative effects on an electrical circuit. Typically, it may have been thought that exposure to moisture may not have had an impact on optical circuits as water may not interfere with light as it interferes with electricity. In almost all embodiments, the current disclosure has realized that moisture may have a negative impact on an optical circuit. In many embodiments, the current disclosure has realized that if an optical circuit is exposed to moisture, then it can alter optical properties of one or more waveguides of the optical circuit. In certain embodiments, moisture may be able to alter a refractive index of a waveguide. In further embodiments, Applicant has realized that moisture may need to be kept from an optical waveguide in an optical circuit for 1000 hours to prevent a change in the optical index of the waveguide. In almost all embodiments, Applicant has realized that protecting an optical circuit from water does not require the high tolerances and conditions that are used when protecting an electrical circuit from water.

In some embodiments, Applicant has realized that oxides may exhibit different properties when exposed to moisture. In further embodiments, Applicant has realized that different oxides have different resistance to moisture exposure and may provide protection against moisture. In certain embodiments, if an oxide is applied at a very high temperature, such as in much excess of 400° C. then an oxide may provide a good barrier to moisture. In many embodiments, Applicant has realized that in certain foundries or where an optical or electrical circuit is made, an oxide may only be applied at a temperature of around 400° C. as a higher temperature application may cause problems with other metals in an electrical or optical circuit. In most embodiments, Applicant has realized that denser oxides that cure at higher temperatures may not be able to be used as a moisture barrier, as these oxides cure at temperatures higher than 450° C.

In many embodiments, Applicant has realized that Silicon Nitride may be a beneficial moisture barrier for photonic integrated circuits, optical devices, optical circuits, waveguides, and other apparatus, systems, and assemblies. In some embodiments, Silicon Nitride may be applied at a thickness of 125 nm or more. Typically, an electrical circuit may have about 125 nm of oxide coating. In certain embodiments, Applicant has realized that silicon nitride may be transparent to an optical circuit. In almost all embodiments, Applicant has realized that an oxide coating of 100 nm or more may distort optical properties of a waveguide. In most embodiments, a coating of 100 nm or more of oxide may cause serious unwanted side effects on waveguides in an optical circuit.

In some embodiments, an oxide may be used as a waveguide. In certain embodiments, if an oxide changes an index of a waveguide, this may cause a problem for optical coupling. Typically, for an electrical circuit, a circuit may be coated with an oxide as a layer of the circuit. In most embodiments, Applicant has realized that an optical circuit may be created differently than an electrical circuit. In certain embodiments, an oxide layer of an optical circuit may be removed to enable a portion of the optical circuit to be etched. In some embodiments, after a portion of an optical circuit is etched, there may be no oxide coating to protect against moisture.

In many embodiments, application of a small layer of oxide having a thickness in the range of about 10 nm to about 25 nm may be used to cover the portion of the oxide removed to cover the etched portion of the optical circuit. In some embodiments, after a suspended cantilever type waveguide is etched into an optical circuit, an oxide layer may be applied to a top, sides, and bottom of the suspended cantilever type waveguide. In other embodiments, before a suspended cantilever type waveguide is etched into an optical circuit, an oxide layer may need to be removed from an optical circuit. Typically, an oxide layer may only be applied to a top of an electrical or optical circuit. Various embodiments may include a stack of various layers, gaps, regions, and coatings. In most embodiments, one or more of the layers are formed from an optical waveguide material such silicon oxide, such thermal silicon oxide or deposited silicon oxide, silicon nitride, or combinations thereof. Other materials may be used as an optical waveguide material, without limitation. The various layers and coatings disclosed herein may have different surfaces, such as top surfaces, bottom surfaces, side surfaces, as a result of their formation, etching and deposition and through other processes and transformations.

In a particular embodiment, an optical circuit may need to have an oxide layer removed, etch a waveguide, and then have a smaller or thinner oxide layer deposited over the etched waveguide. In some embodiments, the smaller oxide layer has a thickness that ranges from about 10 nm to about 25 nm. In many embodiments, a waveguide may be a suspended waveguide. In almost all embodiments, a suspended waveguide may have a top and sides. In certain embodiments a suspended waveguide may have a bottom. In certain embodiments, all exposed sides of a waveguide may need to be covered in an oxide to protect against moisture. In at least some embodiments, if a waveguide has an exposed bottom, the exposed bottom of the waveguide may not need to be covered by an oxide. In many embodiments, moisture protection for a waveguide may need to last 1000 hours to be effective. In certain embodiments, a passivation layer having a thickness that ranges from about 10 nm to about 25 nm may protect a waveguide from moisture.

In some embodiments, the passivation layer includes silicon nitride. In many embodiments, etching and adding an additional nitride layer may require additional masks. In further embodiments, with an optical circuit, it may be possible to eliminate a first coating of an oxide, to eliminate a need to remove a coating, etch a waveguide, then cover the waveguide or certain exposed portions of the waveguide with a nitride coating having a thickness that ranges from about 10 nm to about 25 nm. In most embodiments, etching to create a side of a waveguide may not be standard and typical methods of putting an oxide on an electrical or optical chip may not coat sides of a waveguide.

In some embodiments, the current disclosure enables a passivated optical waveguide with a thin dielectric coating layer that may function as a moisture permeation barrier. In certain embodiments, a passivation layer may be very thin so that it does not distort the optical mode significantly and enables moisture protection. The thin dielectric coating layer/thin passivation layer may have a thickness that ranges from about 10 nm to about 25 nm.

Generally, silicon photonics leverages the mature complementary metal-oxide-semiconductor (CMOS) manufacturing and shares many of the traditional microelectronic processes in a silicon foundry. Typically, as is done with microelectronic chips, the surface of a silicon photonic wafer may be coated with a passivation layer to protect the chip from corrosion and moisture. Usually, the thickness of the passivation layer is on the order of a few hundred nanometers. In various embodiments, the thickness of the thick passivation layer ranges from about 100 nm to about 500 nm.

In most embodiments for an optical chip, under a passivation layer, a silicon waveguide or silicon nitride waveguide may be covered by a few microns of silicon dioxide cladding. In some embodiments, oxide may be deposited by chemical vapor deposition (CVD) and the thickness is thick enough so that the optical mode is confined in a core on the silicon dioxide layer, and does not extend to a passivation layer. Usually, the thickness of the oxide is greater than 100 nm and may be several hundred nm.

In some embodiments, a high index contrast between silicon and silicon dioxide may result in a small mode field diameter (MFD), usually smaller than one micron. In certain embodiments, such as in a mode spot size converter for fiber coupling, a MFD may be increased to a few microns or even about 10 microns to match an optical fiber mode. In certain embodiments, by waveguide tapering, an optical mode may be transited from a tightly confined mode mostly in silicon to a weakly confined mode mostly in $SiO_2$ with its mode field extending out of the surface of the chip. In some embodiments, a refractive index of $Si_3N_4$ of approximately 2 at telecommunication optical wavelengths may be higher than $SiO_2$ of around 1.45, and a thick $Si_3N_4$ passivation layer on a top may significantly distort the optical mode. In certain embodiments, to form a $SiO_2$ waveguide, $Si_3N_4$ passivation layer on the top may be removed, and a silicon substrate may be removed locally by silicon isotropic etch via a trench through the oxide, as shown in the example embodiment of FIG. 1A.

Figure 1A:
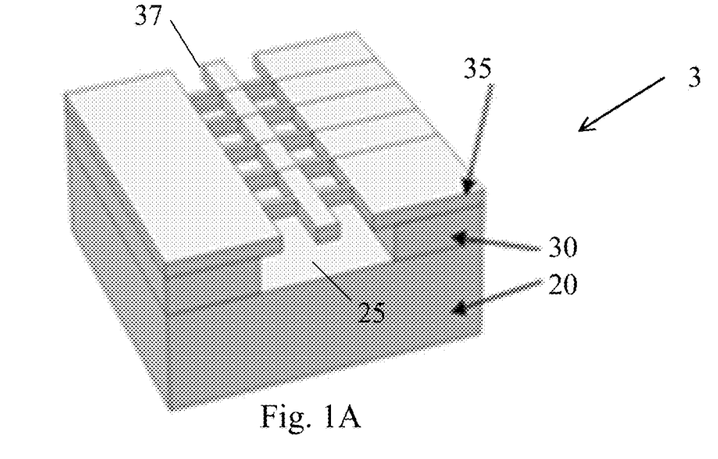
FIG. 1A is three-dimensional perspective drawing depicting a cantilever spot size converter for fiber coupling according to an exemplary embodiment of the disclosure.

Refer now to the example embodiment of FIG. 1A. FIG. 1A is three-dimensional perspective drawing depicting a cantilever spot size converter 3 for fiber coupling. During fabrication of the converter 3, initial a layer of silicon 20 such as a silicon wafer is the starting point. In some embodiments, thermal silicon 30 such as thermal silicon oxide is grown or formed relative to silicon 20. In the example embodiment of FIG. 1A, silicon 20 is removed to reduce optical leakage into the substrate. In various embodiments, the substrate is silicon 20 although other layers and materials may be used in some embodiments. As a result of the removal of silicon 20, a cavity or channel 25 is formed. In various embodiments, the cavity or channel 25 is formed by etching. In various embodiments, the thermal silicon may be grown as a continuous layer on top of the silicon 20 and etched simultaneously with the silicon layer 20. A layer of deposited $SiO_2$ 35 may be deposited on the thermal silicon layer 30. The suspended $SiO_2$ waveguide 37 is supported by periodic support beams. Optical mode is guided in the $SiO_2$ core and the air cladding. Alternatively, the $SiO_2$ core can be surrounded by epoxy with a refractive index lower than $SiO_2$ as a cladding. In various embodiments, the waveguides disclosed herein may be cladded by optical epoxy. In various embodiments, the cantilever spot size converter 3 may include one or more thick passivation layers and one or more thin passivation layers.

Figure 1B:
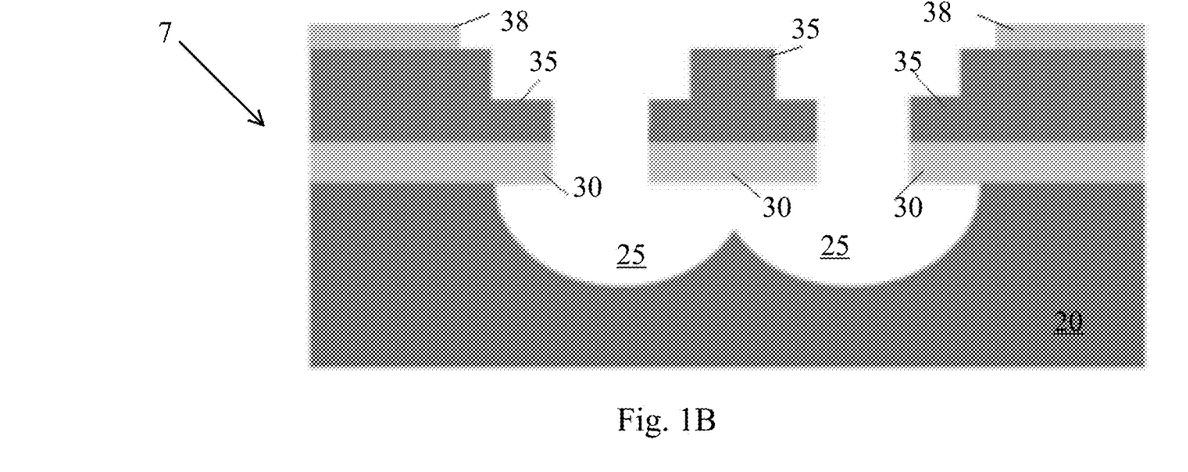
FIG. 1B is a schematic diagram showing a cross-sectional view of a cantilever spot size converter according to an exemplary embodiment of the disclosure.

Refer now to the example embodiment of FIG. 1B. FIG. 1B is a schematic diagram showing a cross-sectional view of a cantilever spot size converter. In FIG. 1B, the various layers and portions thereof discussed with respect to FIG. 1A are shown in a cross-sectional view with regard to another cantilever spot size converter 7. The converter shown in FIG. 1B, includes the various silicon 20, thermal $SiO_2$ 30, and deposited $SiO_2$ 35, shown relative to air gap cavity 25. In addition, the converter 7 of FIG. 1B also shows a thick moisture protection region 38 on the left and right sides of the converter 7. The thick moisture protection region 38 is several hundred nanometers in thickness. The traditional passivation method with a relative thick passivation layer 38 has various disadvantages as disclosed herein.

In many embodiments, silicon nitride may have superior moisture resistance, and may commonly be used in microelectronics as a passivation coating layer. Typically, compared to silicon nitride and thermal oxide, deposited $SiO_2$ is much more susceptible to moisture permeation. In many embodiments, Applicant has realized that moisture can penetrate a few microns into deposited $SiO_2$ and may significantly increase a refractive index of $SiO_2$ after a few hundred hours at 85° C. and 85% relative humidity, which are the requirements within the Telcordia GR-1221 test specification for damp heat storage testing.

In many embodiments, Applicant has realized that increasing refractive index in the $SiO_2$ by moisture distorts the optical mode and excites the higher order mode, resulting in wavelength dependent loss and polarization dependent loss. In addition embodiments, Applicant has realized that moisture in waveguide induces optical absorption loss. In many embodiments, when a waveguide is attached to an optical fiber, coupling loss to the fiber may increase after moisture intake. In certain embodiments, loss increase due to moisture may be over a few decibels in which case the device will not pass the damp heat storage test. In some embodiments, moisture resistance of $SiO_2$ may depend on a deposition process used. In almost all embodiments, Applicant has realized that high temperature deposition and annealing above 800° C. can significantly increase the moisture resistance; however, the CMOS backend process temperature used to create electrical and optical circuits may be limited to around 400° C.

In some embodiments, the current disclosure may enable a passivated silicon photonic waveguide with a thin dielectric coating layer that functions as a moisture barrier. In many embodiments, a passivated waveguide may have an optical mode that extends out of a surface of a chip so that traditional passivation method with a relative thick passivation layer does not apply since it can significantly distort the optical mode. In certain embodiments, thickness of a passivation layer may be thin enough to avoid significant change to the optical mode, but still may be sufficiently thick for moisture protection.

In many embodiments, a passivation layer or coating may be silicon nitride ($Si_3N_4$ or $SiN_x$) or silicon oxynitride ($SiO_xN_y$), or other passivation materials with high moisture resistance such as metal oxide and metal nitride. In various embodiments, a passivation coating may be achieved by various deposition methods, such as chemical vapor deposition, sputtering, atomic layer deposition, and electron-beam deposition. In some embodiments, for silicon nitride, a thin coating thickness may be from a few nanometers to a few tens of nanometers. In a particular embodiment, a preferred value may be about 20 nm. In many embodiments, for silicon oxynitride, the refractive index of the passivation layer may be tuned between the index of silicon nitride and silicon dioxide. In various embodiments using a silicon oxynitride passivation layer, the thickness of the layer may be increased if the refractive index of the passivation layer is tuned lower.

Figure 2:
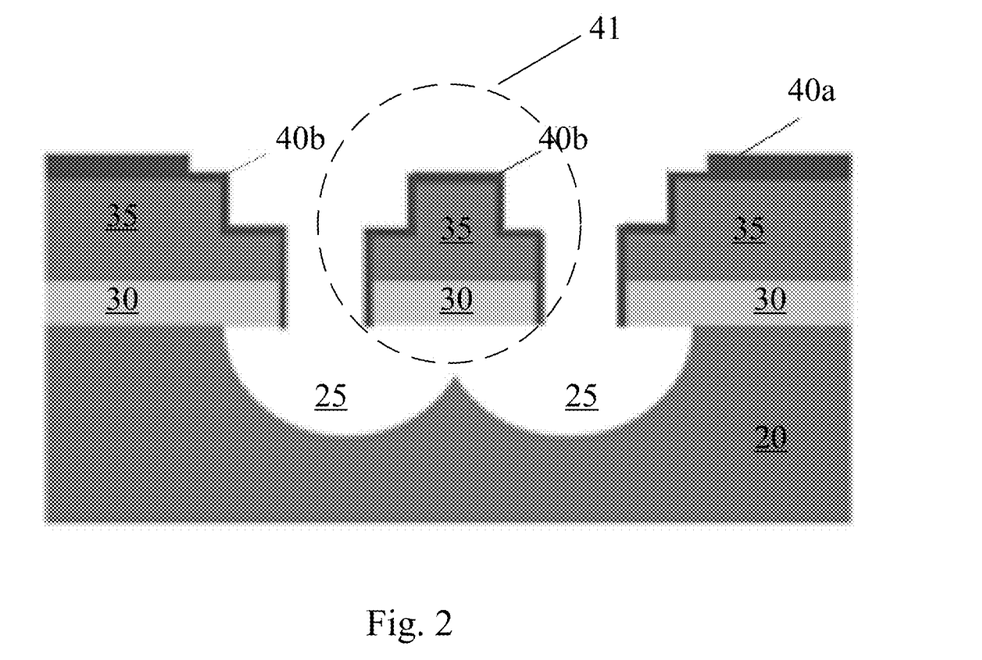
FIG. 2 is a schematic diagram showing cross-sectional view of a suspended waveguide with a passivation layer or coating on the top and sidewall for moisture protection that used air cladding according to an exemplary embodiment of the disclosure.

Refer now to the example embodiment of FIG. 2. The example embodiment of FIG. 2 shows an example with thin passivation coating or layer 40b generally, such as a $Si_3N_4$ coating, disposed on a suspended $SiO_2$ waveguide 37 corresponding to the waveguide 37 shown in FIG. 1A. In this embodiment, the thickness of the thin $Si_3N_4$ layer is on the order of about 10 nm to about 20 nm. The coating 40b is applied or deposited after the silicon isotropic etch so that the waveguide top surface and sidewall are coated. A thicker passivation layer 40a may be used in some embodiments. In various embodiments, various waveguide materials such as silicon dioxide or other materials may be used to form a waveguide 41. As shown, various surface sand edges of waveguide 41 are passivated using a thin layer or coating 40b. In some embodiments, the thick passivation layer 40a is not used and only the thin passivation layer 40b is used. In some embodiments, the thermal oxide of the silicon-on-insulator wafer, which is in the bottom part of the waveguide, has high moisture resistance so that additional coating is not needed.

A given embodiment may also include period support beams that may be formed through various etching and deposition processes. The various gaps and support beams are shown in FIG. 1A. In various embodiments, the suspended device of FIG. 1A may include a thin passivation layer as disclosed herein. In various embodiments, a given support may also be coated with a passivation layer. The suspended $SiO_2$ waveguide 37 is supported by periodic support beams. In various embodiments, the support beams or portions thereof are also coated with a passivation layer. In some embodiments, the support beams are formed from thermal silicon or silicon dioxide, other materials, or combinations thereof.

Figure 3A:
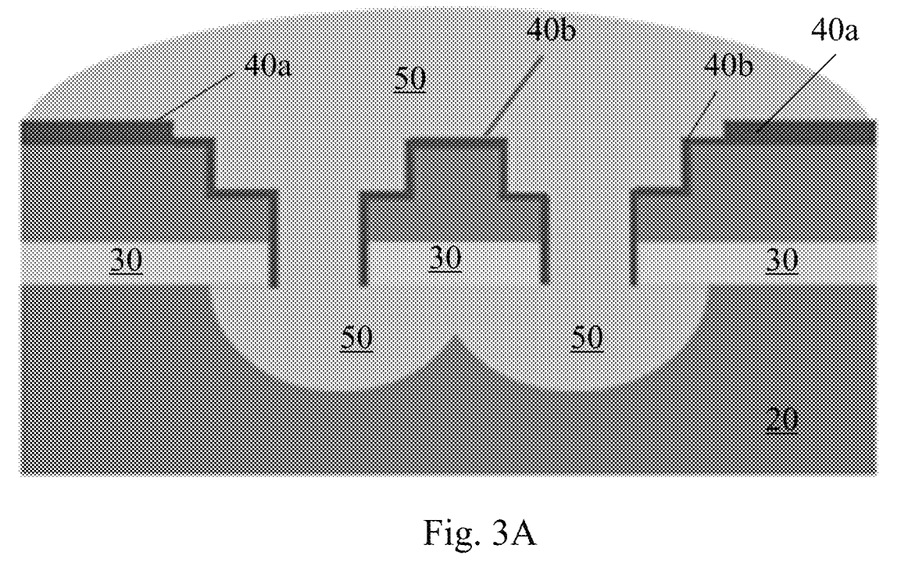
FIG. 3A is a schematic diagram of a suspended waveguide with a passivation layer or coating on the top and sidewall for moisture protection that used epoxy cladding according to an exemplary embodiment of the disclosure.

Refer now to the example embodiment of FIG. 3A. As shown in FIG. 3A, epoxy 50 is added to surround the $SiO_2$ waveguide. In some embodiments, the epoxy operates as a cladding. In various embodiment, epoxy may be used in coupling devices. In certain embodiments, a waveguide may also have one or multiple silicon/silicon nitride cores. In some embodiments, along the propagation direction of a waveguide, a silicon/silicon nitride core may gradually taper to expand the optical mode.

Figure 3B:
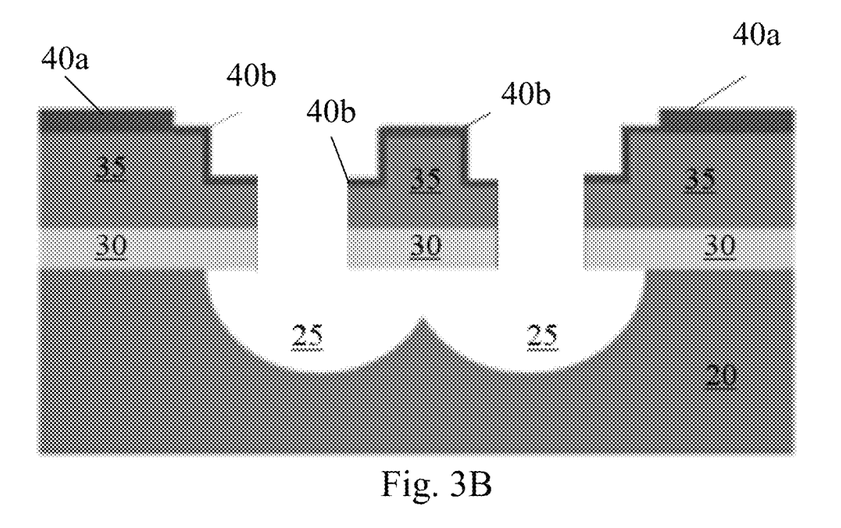
FIG. 3B is a schematic diagram of a suspended waveguide that was fabricated such that different passivation layer thicknesses according to an exemplary embodiment of the disclosure.

Refer now to the example embodiment of FIG. 3B. The example embodiment of FIG. 3B shows an example suspended waveguide that was fabricated by applying a passivation layer before performing the $SiO_2$ trench and Si isotropic etch. The sidewalls of the trench are not coated. In FIG. 3B, there is a thick coating of the passivation layer 40a and a thin coating of the passivation layer 40b. The thin passivation layer 40b shows where the passivation layer has been removed and replaced with a thinner layer after creation of the waveguide. In some embodiments, moisture penetration from the sides may have a weaker impact to the optical performance compared to moisture penetration from the top so that partial coating from the top side can be acceptable.

Refer now to the example embodiments of FIGS. 4A, 4B, 4C, and 4D. In the example embodiments of 4A, 4B, 4C, and 4D, different ways of applying the passivation coating to other types of waveguides are shown. As discussed above, in various embodiments there is a thick coating of the passivation layer 40a and a thin coating of the passivation layer 40b as shown in FIGS. 4A-4D. In some embodiments, the thickness of the passivation is uniform.

Figure 4A:
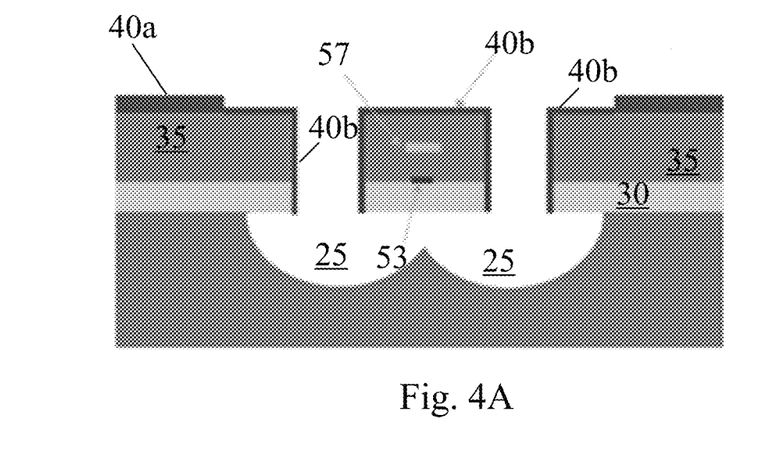
FIGS. 4A, 4B, 4C, and 4D are schematic diagrams showing various passivated waveguides that have been fabricating by applying passivation coating according to exemplary embodiments of the disclosure.

FIG. 4A shows a waveguide 53 with a metal heater 57. The waveguide 53 and the metal heater 57 are positioned to operate as suspended thermo-optical phase shifter. The optical mode can be tightly confined in this embodiment. Accordingly, the passivation coating is mainly applied in some embodiments to protect the metal heater, for example titanium nitride, from moisture corrosion.

Figure 4B:
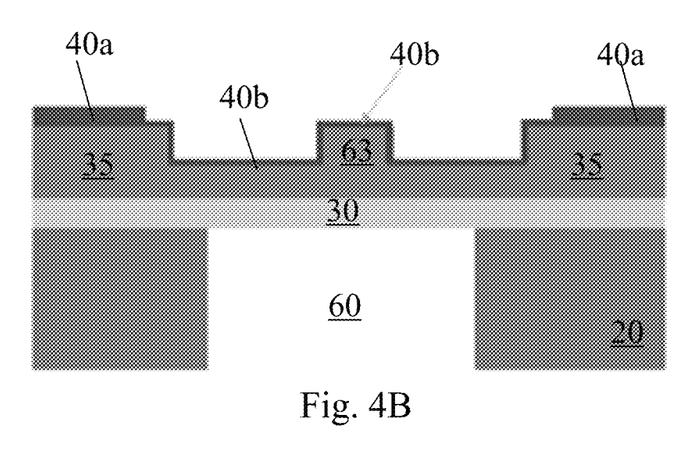

FIG. 4B shows a waveguide using an alternative method to remove the silicon substrate by etching from the backside. Etching from the backside is advantageous because it avoids removing material from the top surface and does not need to pass through the trench on the surface, thus microfabrication processing on the surface is easier. Cavity or volume 60 shows the region from which substrate material, such as silicon 20, has been removed. The trenches through thermal silicon oxide 30 and deposited silicon oxide 35 can be avoided. The optical mode is confined laterally by the $SiO_2$ ridge 63, which operates as a waveguide.

Figure 4C:
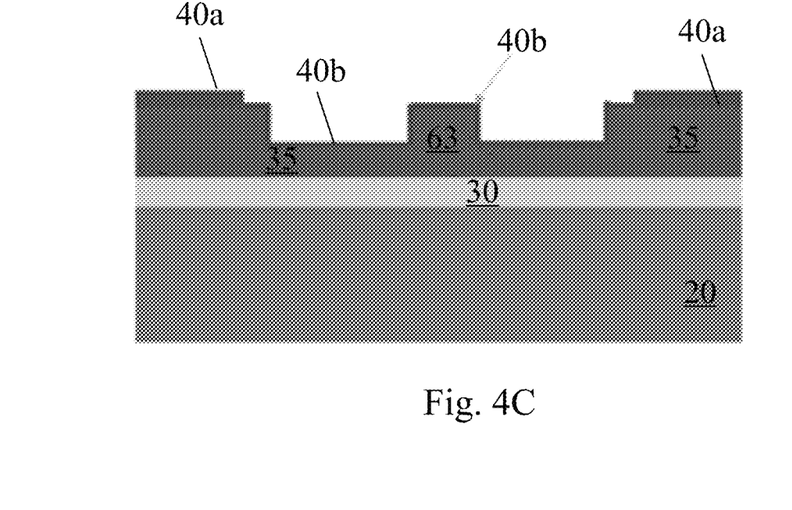
Figure 4D:
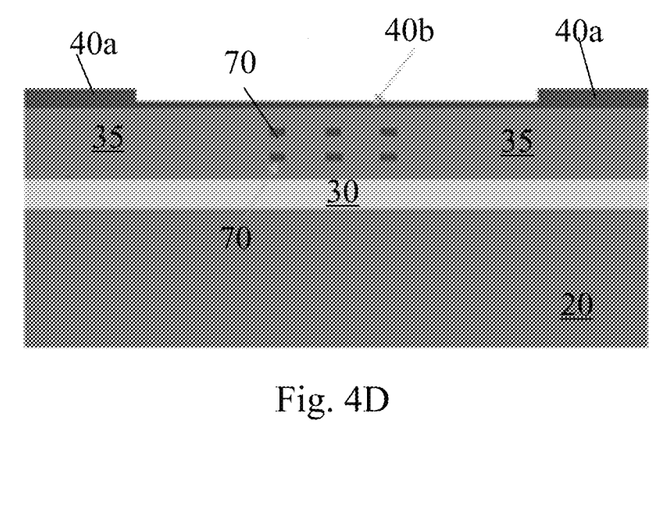

FIG. 4C and 4D show two example optical structures in which the removal of the silicon substrate 20 can be avoided by confining the optical mode in high index $SiO_2$ waveguide region 63 or multiple silicon nitride waveguides 70. In various embodiments, the Si removal step is required if the optical mode can see the Si substrate. In the case of high index oxide, the optical mode is confined by upper high oxide layer, thus no or little light will see the substrate. In FIG. 4C a high index $SiO_2$ layer is deposited on thermal oxide layer 30 or selected regions thereof. A central waveguide portion 63 and the high index $SiO_2$ are all coated with a passivation layer or coating. Removing substrate 20 will create trench on the surface, which will disallow further wet lithography steps after the trench patterning. The optical mode power in the silicon substrate can be significantly reduced so that the leaky loss can be acceptable. In various embodiments, mode power is mostly confined in the waveguide region 63. If the optical mode extends to the silicon substate, it will cause optical losses that enter the substrate.

FIG. 4D shows an arrangement of silicon nitride waveguides 70 arranged as an array in deposited silicon oxide layer 35. A passivation layer is also applied thereto. In some embodiments the passivation layer is uniform and in other embodiments a thick passivation layer 40a and thin layer 40b are used. The thin layer 40b may result from further etching of thick initial layer 40a in various embodiments. The thick layer 40a may be 100 nm or multiples thereof. Although an array of six silicon nitride wave guides is shown, one or more silicon nitride waveguides may be used in various embodiments. Not etching substrate 20 is advantageous because a greater degree of optical confinement by the multiple silicon waveguide results so that the amount of light reaching the substrate is significantly reduced.

In many embodiments, passivation layers, coatings, structures, fabrication methods and related concepts disclosed herein may not be limited to silicon photonics, and may be applied to other integrated photonic platforms and photonic and optical devices, combination electro-optical devices, group III-V semiconductor-based devices, glass planar lightwave circuit (PLC), and lithium niobate-based devices and fabrication processes used for all of the foregoing.

Figure 5A:
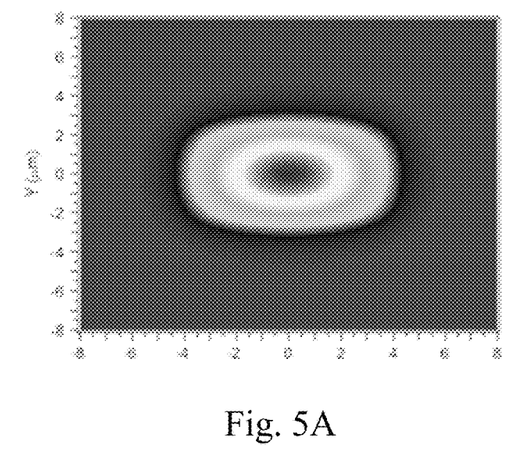
FIGS. 5A, 5B, 5C, and 5D are graphs of the optical electric field of TE and TM mode for a $SiO_2$ waveguide for various implementations according to an exemplary embodiment of the disclosure.
Figure 5B:
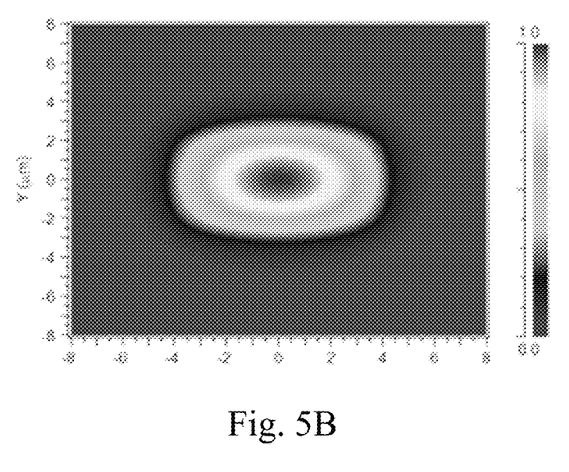
Figure 5C:
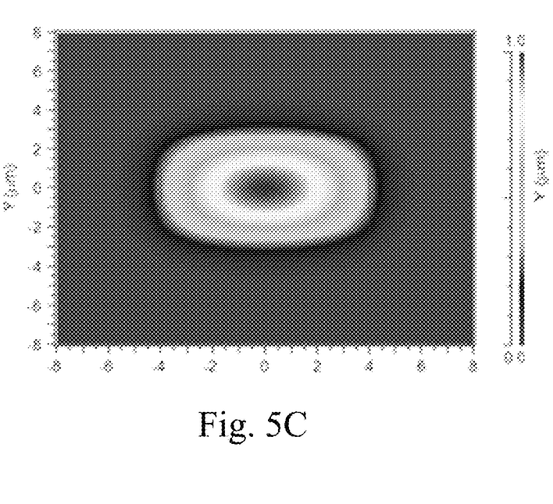
Figure 5D:
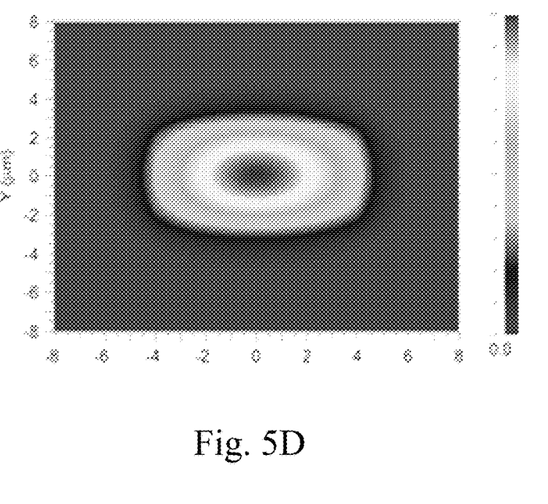

Refer now to the example embodiments of FIGS. 5A, 5B, 5C, and 5D. FIGS. 5A and 5B are plot of example embodiments of optical electric field of TE and TM mode for a $SiO_2$ waveguide, respectively. FIGS. 5C and 5D are plots of example embodiments of optical electric field of TE and TM mode for the same $SiO_2$ shown above in FIGS. 5A and 5B, respectively, with a 20 nm, $Si_3N_4$ passivation coating disposed on the top surface and side walls of the $SiO_2$ waveguide. The example embodiment of FIGS. 5A, 5B, 5C, and 5D show an example of the impact of the $Si_3N_4$ coating to the optical mode of a Sift waveguide. The $SiO_2$ waveguide is about 8 um wide and about 5 um tall. In some embodiments, a layer of $Si_3N_4$ having a thickness of about 20 nm is coated on the top side and the sidewall of the $SiO_2$ waveguide. By comparing the optical mode field before and after application of $Si_3N_4$ coating, the about 20 nm thick $Si_3N_4$ coating does not change the optical mode significantly.

In various embodiments, the passivation layers and other features disclosed herein are suitable for use with PICs and other optical devices used in non-hermetic packages. In various embodiments, the thin passivation layers include silicon nitride and/or other materials selected to maintain optical operating parameters while still preventing water and moisture contamination.

Having thus described several aspects and embodiments of the technology of this application, it is to be appreciated that various alterations, modifications, and improvements will readily occur to those of ordinary skill in the art. Such alterations, modifications, and improvements are intended to be within the spirit and scope of the technology described in the application. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, and/or methods described herein, if such features, systems, articles, materials, and/or methods are not mutually inconsistent, is included within the scope of the present disclosure.

In most embodiments, a processor may be a physical or virtual processor. In other embodiments, a virtual processor may be spread across one or more portions of one or more physical processors. In certain embodiments, one or more of the embodiments described herein may be embodied in hardware such as a Digital Signal Processor (DSP). In certain embodiments, one or more of the embodiments herein may be executed on a DSP. One or more of the embodiments herein may be programmed into a DSP. In some embodiments, a DSP may have one or more processors and one or more memories. In certain embodiments, a DSP may have one or more computer readable storages. In many embodiments, a DSP may be a custom designed ASIC chip. In other embodiments, one or more of the embodiments stored on a computer readable medium may be loaded into a processor and executed.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The phrase "and/or," as used herein in the specification and in the claims, should be understood to mean "either or both" of the elements so conjoined, i.e., elements that are conjunctively present in some cases and disjunctively present in other cases.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

In the claims, as well as in the specification above, all transitional phrases such as "comprising," "including," "carrying," "having," "containing," "involving," "holding," "composed of," and the like are to be understood to be open-ended, i.e., to mean including but not limited to. The transitional phrases "consisting of" and "consisting essentially of" shall be closed or semi-closed transitional phrases, respectively.

Where a range or list of values is provided, each intervening value between the upper and lower limits of that range or list of values is individually contemplated and is encompassed within the disclosure as if each value were specifically enumerated herein. In addition, smaller ranges between and including the upper and lower limits of a given range are contemplated and encompassed within the disclosure. The listing of exemplary values or ranges is not a disclaimer of other values or ranges between and including the upper and lower limits of a given range.

The use of headings and sections in the application is not meant to limit the disclosure; each section can apply to any aspect, embodiment, or feature of the disclosure. Only those claims which use the words "means for" are intended to be interpreted under 35 USC 112, sixth paragraph. Absent a recital of "means for" in the claims, such claims should not be construed under 35 USC 112. Limitations from the specification are not intended to be read into any claims, unless such limitations are expressly included in the claims.

Embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, embodiments may take the form of a computer program product embodied in one or more computer readable medium(s) having computer readable program code embodied thereon.

What is claimed is:

1. A method for passivating a waveguide of an optical circuit comprising:
    etching a suspended waveguide in the optical circuit; the suspended waveguide having a top surface, a bottom surface, and side surfaces, the suspended waveguide suspended by a plurality of support beams, wherein the suspended waveguide comprises a first layer comprising silicon and a second layer comprising silicon; and covering the top surface and side surfaces of the suspended waveguide with a moisture resistant passivation coating having a thickness that ranges from between about 10 nm to about 20 nm.

2. The method of claim 1 further comprising removing one or more coatings from a portion of the optical circuit.

3. The method of claim 2, wherein the passivation coating is $Si_3N_4$.

4. The method of claim 3 wherein covering the top surface and side surfaces of the suspended waveguide with a moisture resistant passivation coating comprises applying a $Si_3N_4$ coating and removing a portion of the $Si_3N_4$ coating until the $Si_3N_4$ coating has a thickness that ranges from between about 10 nm to about 20 nm.

5. The method of claim 1 wherein the optical circuit comprises a stack of a plurality of layers, wherein one of the layers is silicon substrate having a top surface and a bottom surface.

6. The method of claim 5 further comprising removing a portion of the top surface of the silicon substrate to define a cavity below the suspended waveguide, wherein the suspended waveguide comprises $SiO_2$.

7. The method of claim 5 further comprising removing a portion of the bottom surface of the silicon substrate to define a cavity.

8. The method of claim 5 further comprising forming a metal heater relative to one or more layers of the suspended waveguide.

9. The method of claim 5 wherein the passivation coating is a metal oxide, a metal nitride, or a silicon oxynitride.

10. An optical silicon circuit comprising:
a substrate comprising silicon;
one or more regions of optical waveguide material disposed on the substrate; and
one or more regions of a moisture resistant passivation coating disposed on a top surface and a side surface of the one or more regions of optical waveguide material, wherein thickness of passivation coating ranges from about 10 nm to about 20 nm, wherein the optical waveguide material defines a suspended waveguide, wherein optical waveguide material is etched to define one or more cavities; and
a plurality of support beams, wherein one or more support beams support one side of the suspended waveguide, wherein one or more support beams support the other side of the suspended waveguide.

11. The optical silicon circuit of claim 10 wherein the passivation coating comprises a silicon nitride, a metal oxide, a metal nitride, or a silicon oxynitride.

12. The optical silicon circuit of claim 10 wherein optical waveguide material is etched to define the suspended waveguide.

13. The optical silicon circuit of claim 10 further comprising one or more silicon nitride waveguides disposed in the optical waveguide material.

14. The optical silicon circuit of claim 10 wherein the substrate is silicon-on-insulator wafer having a top surface and a bottom surface.

15. The optical silicon circuit of claim 14 wherein a portion of either the top surface or the bottom surface of the silicon-on-insulator wafer has been removed to define one or more cavities.

16. A method for passivating a waveguide of an optical circuit comprising:
etching a suspended waveguide in an optical circuit; the suspended waveguide having a top, bottom and sides;
covering the top and sides of the suspended waveguide with a moisture resistant passivation coating of a thickness between about 10 nm to about 20 nm; and
removing a portion of the moisture resistant passivation coating, wherein the moisture resistant passivation coating comprises a silicon nitride, wherein the suspended waveguide comprises one or more silicon nitride waveguides disposed in the optical waveguide material.

17. The method of claim 16 wherein the passivation coating comprises $Si_3N_4$.

18. A method for passivating a waveguide of an optical circuit comprising:
etching a suspended waveguide in the optical circuit, the suspended waveguide having a top surface, a bottom surface, and side surfaces, the suspended waveguide suspended by a plurality of support beams;
covering the top surface and side surfaces of the suspended waveguide with a moisture resistant passivation coating; and
removing a portion of the moisture resistant passivation coating until the moisture resistant passivation has a thickness that ranges from between about 10 nm to about 20 nm, wherein the moisture resistant passivation coating is a silicon nitride.

19. The method of claim 18, wherein the moisture resistant passivation coating is $Si_3N_4$.

* * * * *